US007865458B2

(12) United States Patent
Callanan et al.

(10) Patent No.: US 7,865,458 B2
(45) Date of Patent: Jan. 4, 2011

(54) ENFORCING RULE SELECTION ON USER INBOXES

(75) Inventors: Sean Callanan, Dublin 14 (IE); Al Chakra, Apex, NC (US); Sonya Purcell, Tipperary (IE); Hugh Smyth, Dublin 3 (IE)

(73) Assignee: International Business Machines Corporation, Armonk, NY (US)

( * ) Notice: Subject to any disclaimer, the term of this patent is extended or adjusted under 35 U.S.C. 154(b) by 731 days.

(21) Appl. No.: 11/832,100

(22) Filed: Aug. 1, 2007

(65) Prior Publication Data

US 2009/0037359 A1  Feb. 5, 2009

(51) Int. Cl.
*G06F 19/00* (2006.01)
(52) U.S. Cl. .............................. 706/47; 706/45; 706/62; 709/217; 709/218; 709/219
(58) Field of Classification Search ........................ None
See application file for complete search history.

(56) References Cited

U.S. PATENT DOCUMENTS

| 2004/0059790 | A1* | 3/2004 | Austin-Lane et al. ........ 709/207 |
| 2004/0088359 | A1* | 5/2004 | Simpson ...................... 709/206 |
| 2005/0021485 | A1* | 1/2005 | Nodelman et al. ............ 706/21 |
| 2006/0041505 | A1* | 2/2006 | Enyart .......................... 705/40 |
| 2006/0047758 | A1* | 3/2006 | Sharma et al. ............... 709/206 |
| 2007/0226304 | A1* | 9/2007 | Virk et al. .................... 709/206 |
| 2008/0109543 | A1* | 5/2008 | Abanami et al. ............. 709/223 |

OTHER PUBLICATIONS www.en.wikipedia.org/wiki/Gmail, as archived on Jul. 19, 2006 (retrieved from www.archive.org), pp. 1-11.*

* cited by examiner

*Primary Examiner*—Donald Sparks
*Assistant Examiner*—Omar F Fernandez Rivas
(74) *Attorney, Agent, or Firm*—Thomas E. Lees, LLC

(57) ABSTRACT

A method and system for enforcing rule selection on user email inboxes include an inbox monitor and administrative rules at an email server. The inbox monitor includes a first agent for identifying inactive user inboxes from email messages stored at the email database, and a second agent for identifying, from the inactive user inboxes identified by the first agent, user inboxes without appropriate user rules activated. For each user inbox identified by the second agent, administrative rules are applied to the user inbox if the user inbox has been inactive for at least a predetermined period of time. If the user inbox has not been inactive for at least the predetermined period of time, a notification message is sent to a user associated with the user inbox. The notification message informs the user that administrative rules will be applied to the user inbox if appropriate user rules are not activated.

12 Claims, 4 Drawing Sheets

ENFORCING RULE SELECTION ON USER INBOXES

BACKGROUND OF THE INVENTION

Some email client applications allow users to define and set rules for managing their inbox. For example, rules can be set so that certain email messages are moved to a particular folder, deleted, flagged, or redirected, based on set criteria. Other example rules include sending an automatic reply to the sender, and sending window or sound notifications to the user when messages arrive that match the set criteria. These rules are useful tools for managing email inboxes, especially when a user is on vacation or on leave.

When a user goes on an extended leave of absence, the user can define and activate rules to help manage his/her inbox while the user is away. However, if the leave is unexpected, the user may not have these rules activated prior to commencing the leave. Email messages to the user's inbox would thus not be managed while the user is away. For example, message senders may not be notified of the user's absence if no Out of Office message rule has been activated; the user's allotted storage on the email server database may become full before the user returns, preventing further messages from reaching the user; and messages with virus content will sit in the email server database until opened or deleted. When the user returns and accessed his/her inbox, the user would be required to spend a considerable amount of time reviewing and organizing messages. The failure to activate the user rules for his/her email inbox thus results in stress on the email servers and the user upon his/her return.

BRIEF SUMMARY OF THE INVENTION

A method and system for enforcing rule selection on user email inboxes include an inbox monitor and administrator rules at an email server. The inbox monitor includes a first agent for identifying inactive user inboxes from email messages stored at the email database, and a second agent for identifying, from the inactive user inboxes identified by the first agent, user inboxes without appropriate user rules activated. For each user inbox identified by the second agent, administrative rules are applied to the user inbox if the user inbox has been inactive for at least a predetermined period of time. If the user inbox has not been inactive for at least the predetermined period of time, a notification message is sent to a user associated with the user inbox. The notification message informs the user that administrator rules will be applied to the user inbox if appropriate user rules are not activated.

DETAILED DESCRIPTION OF THE INVENTION

The present invention provides a method and system for enforcing rule selection on user email inboxes. The following description is presented to enable one of ordinary skill in the art to make and use the invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

The invention comprises an inbox monitor at an email server. The inbox monitor identifies inactive user inboxes that do not have appropriate user rules activated. If an inactive user inbox, that does not have appropriate user rules activated, has been inactive for at least a predetermined period of time, administrator rules are applied to the inactive user inbox.

Figure 1:
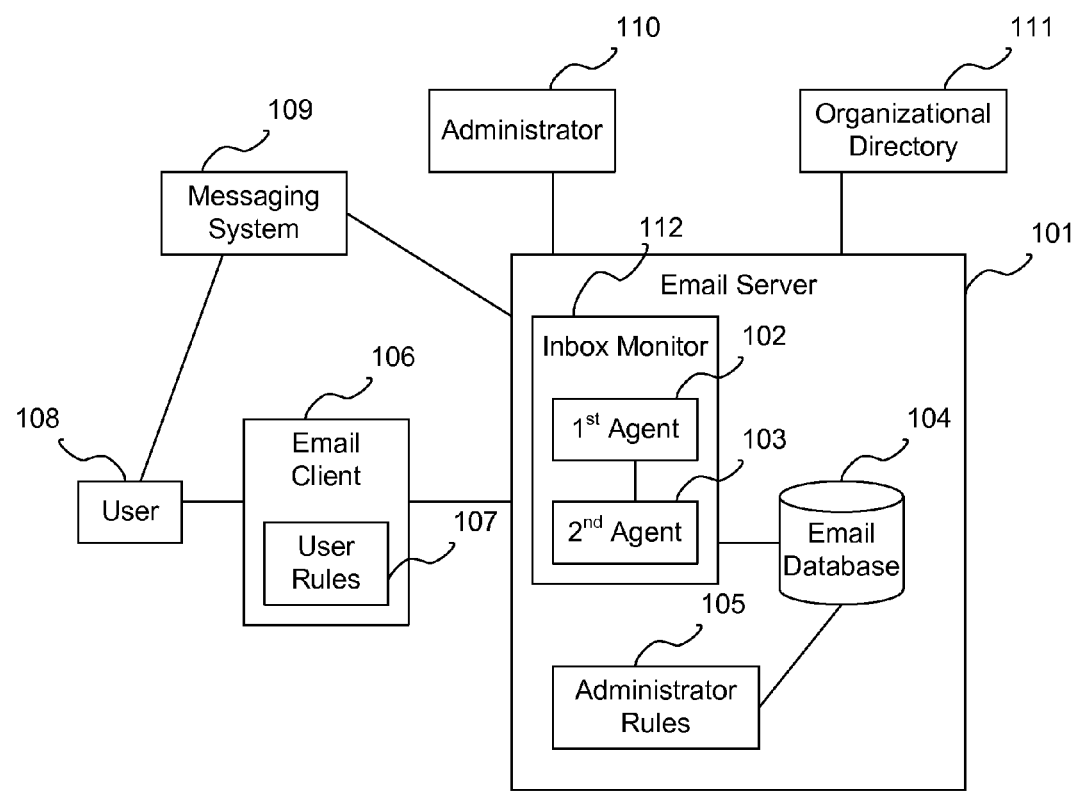
FIG. 1 illustrates an exemplary system for enforcing rule selection on user email inboxes.

FIG. 1 illustrates an exemplary system for enforcing rule selection on user email inboxes. The system includes an email server 101 for providing email service to users 108 at email clients 106. Although the email server 101 is illustrated as a single server, one of ordinary skill in the art will understand that the email service can be provided by a plurality of email servers without departing from the spirit and scope of the invention. The email server 101 stores user email messages in an email database 104. The email server 101 includes an inbox monitor 112. In one exemplary embodiment, the inbox monitor 112 includes a first agent 102 and a second agent 103 for managing the email messages stored at the email database 104, as described further below. The agents 102-103 are batch files that run with code to execute against the email server 101 with certain criteria attached to identify information. Although a plurality of separate agents 102-103 are described in the exemplary embodiment, one of ordinary skill in the art will understand that a single agent can be used to provide the same functionality without departing from the spirit and scope of the invention.

The email server 101 is managed by an administrator 110 and further includes administrator rules 105, which can be applied to any of the messages stored at the email database 104. The email server 101 has access to at least one message system 109, such as Short Messaging System (SMS) or text messaging system, wireless network, pager, email, Radio Frequency Identifier (RFID), etc., for sending messages to users 108. The user 108 at the email client 106 can define and activate one or more user rules 107 for managing the user's email inbox. If the email service is being provided to a plurality of users in an organization, then the email server 101 can have access to an organizational directory 111, which contains information on the personnel of the organization.

Figure 2:
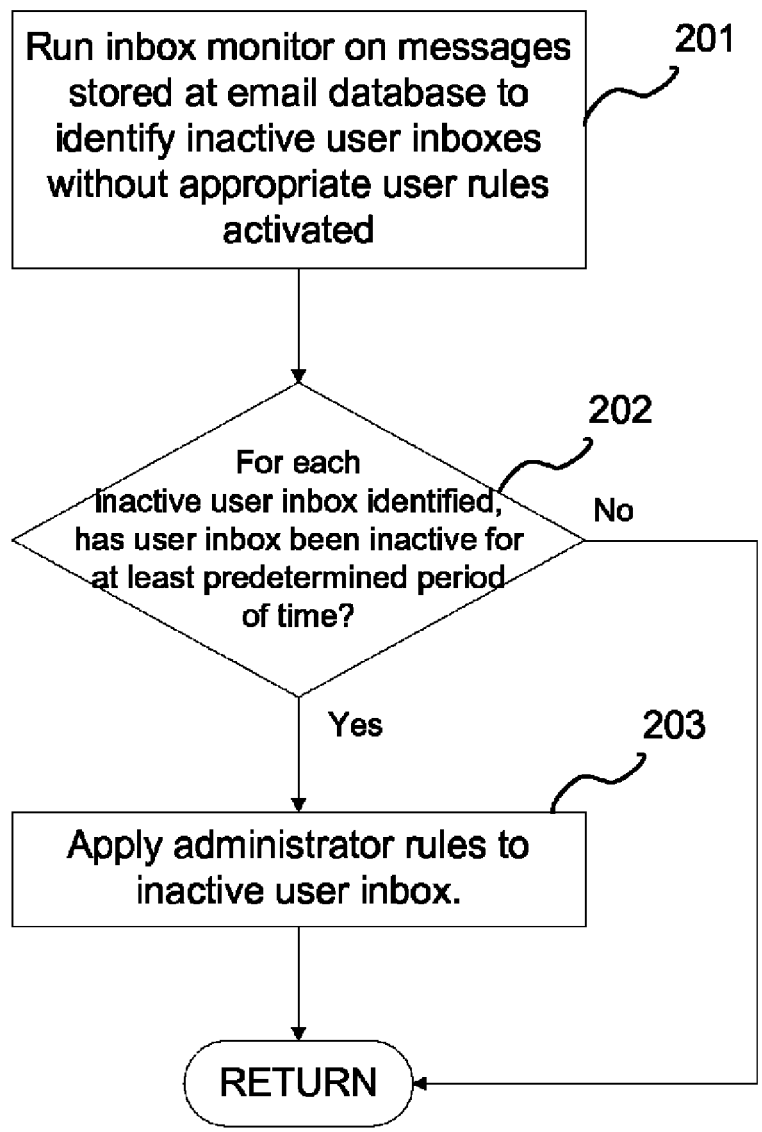
FIG. 2 is a flowchart illustrating an exemplary method for enforcing rule selection on user email inboxes.

FIG. 2 is a flowchart illustrating an exemplary method for enforcing rule selection on user email inboxes. Referring to both FIGS. 1 and 2, the inbox monitor 112 at the email server 101 is run on the messages stored at the email database 104 to identify inactive user inboxes that do not have appropriate user rules 107 activated (step 201). For each inactive user inbox identified, the amount of time that the user inbox has been inactive is determined. If the user inbox has been inactive for at least a predetermined period of time (step 202), the administrator rules 105 are applied to the inactive user inbox (step 203).

The criteria for inactivity of a user inbox are configurable. For example, the first agent 102 can be configured to identify user inboxes to which its associated user has not accessed for at least a predetermined period of time.

The criteria for appropriateness of the user rules are also configurable, depending on the limits and requirements of the email server 101. For example, user rules are deemed inappropriate if no user rules are activated or the user rules lack a threshold of restrictiveness. For example, user rules are deemed to lack the threshold of restrictiveness if no Out of Office message is activated or no user rules for deleting email are activated. If the user rules 107 are deemed to not be restrictive enough, the administrator rules 105 are applied to the user inbox, either in addition to or instead of the user rules 107.

Figure 3:
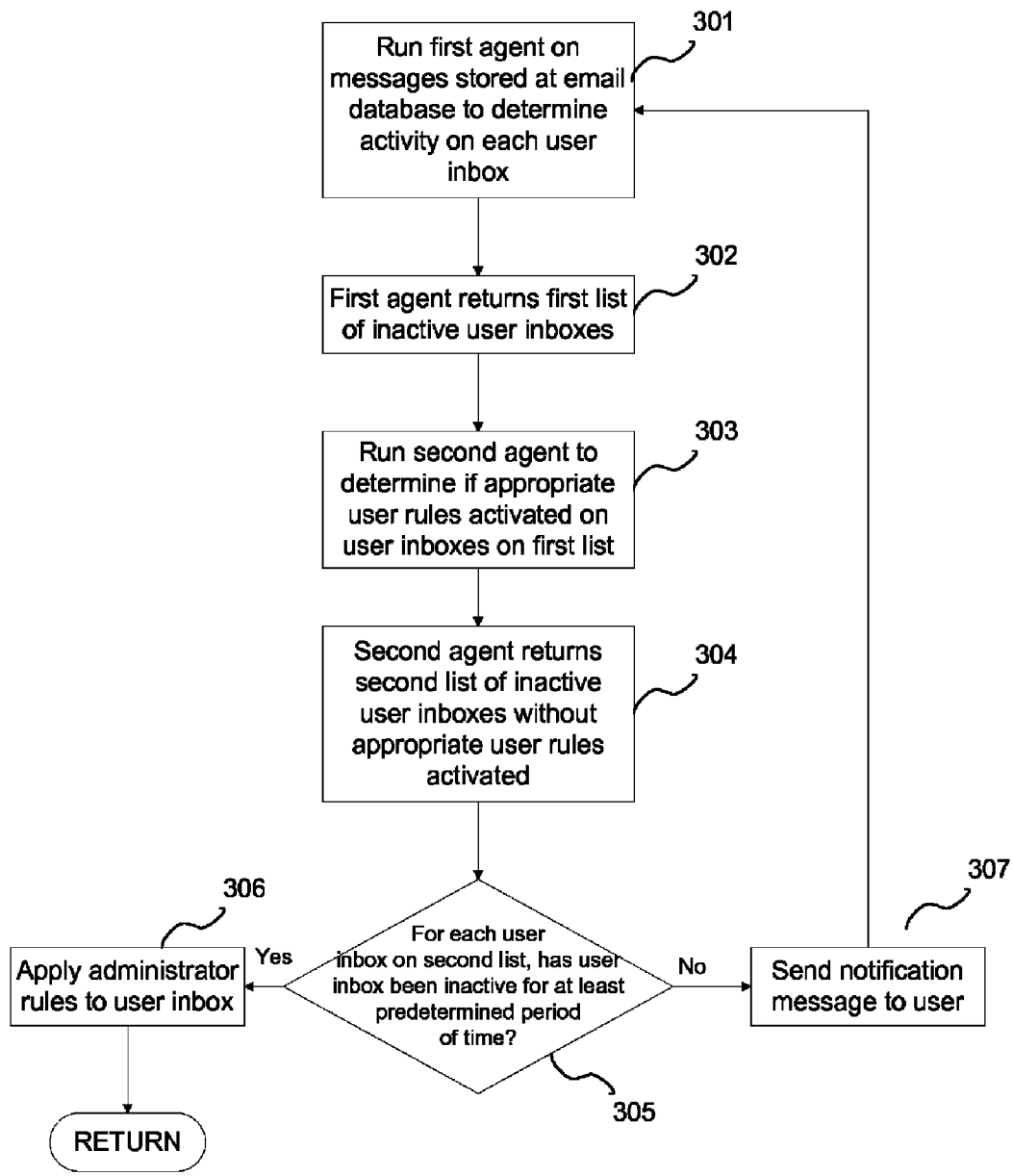
FIG. 3 is a flowchart illustrating in more detail the exemplary embodiment of the method for enforcing rule selection on user email inboxes.

FIG. 3 is a flowchart illustrating in more detail the exemplary embodiment of the method for enforcing rule selection on user email inboxes. The first agent 102 at the email server 101 is run on the messages stored at the email database 104 to determine the activity on each user inbox (step 301). The first agent 102 returns a first list of inactive user inboxes (step 302). The second agent 103 is then run on the first list to determine if appropriate user rules 107 have been activated on the user inboxes on the first list (step 303). The second agent 103 returns a second list of inactive user inboxes without appropriate user rules 107 activated (step 304).

In the exemplary embodiment, the administrator 110 reviews the second list to determine if any of the user inboxes on the second list has been inactive for at least a predetermined period of time (step 305). If not, then the administrator 110 sends a notification message using the messaging system 109 to the user 108 associated with the inactive user inbox (step 307). The message notifies the user 108 that administrator rules 105 would be applied to the user inbox if the user 108 does not activate appropriate user rules 107. If the user 108 does not activate appropriate user rules 107, then the user inbox will continue to be on the first and second lists in subsequent runs of the first and second agents 102-103 (steps 301-304). Once the inactive user inbox has been on the second list for at least a predetermined period of time (step 305), the administrator rules 105 are applied to the user inbox (step 306). If the user 108 responds to the administrator's message by activating user rules 107, then the user inbox would cease to be on the first list. Thus, the administrator rules 105 would not be applied to this user inbox.

For example, assume that a user 108 has been on an unexpected leave of absence due to illness for over 4 weeks. The user 108 did not have the opportunity to apply any user rules 107 to his inbox. Assume also that the first and second agents 102-103 are run once a week as part of the routine management of the email system. During week one of the user's absence, the first agent 102 determines that the inbox of the user 108 is inactive, and the first agent 102 returns the first list with the user's inbox listed (steps 301-302). The second agent 103 is run against the first list, and the second agent 103 determines that the inbox of the user 108 has no user rules 107 activated (step 303). The second agent 103 returns the second list with the user's inbox listed (step 304). The administrator 110 reviews the second list and determines that the user's inbox has been on the second list for one week. Assuming that the predetermined time period of allowed inactivity is configured to be four weeks, the administrator rules 105 are not yet applied to the user inbox. Instead, a notification text message is sent to the user's cellular phone, using messaging system 109 (step 307).

As long as the user 108 fails to access his inbox and fails to activate appropriate user rules 107, the user's inbox will continue to be listed on the first and second lists on subsequent runs of the first and second agents 102-103. At each return of the second list, a notification message can be sent to the user 108 using the messaging system 109 (step 307). Alternative, only one notification message is sent to the user 108 even though the user inbox is listed on the second list for multiple weeks.

Assuming that after the fourth week of the user' absence, the first agent 102 determines that the inbox of the user 108 is still inactive, the first agent 102 returns the first list with the user's inbox listed (steps 301-302). The second agent 103 is run against the first list, and the second agent 103 determines that the inbox of the user 108 still has no user rules 107 activated (step 303). The second agent 103 returns the second list with the user's inbox listed (step 304). The administrator 110 sees that the inbox for the user 108 has been on the second list for over four weeks (step 305) and applies the administrator rules 105 to the user's inbox (step 306).

Figure 4:
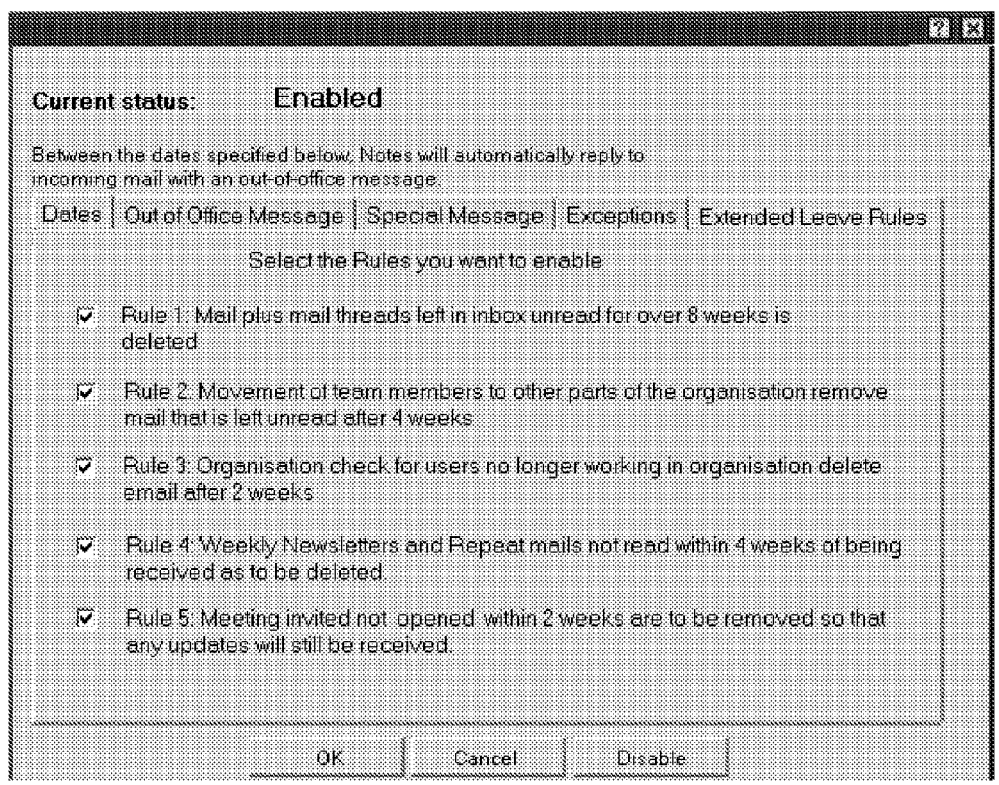
FIG. 4 illustrates example administrator rules that can be applied to an inactive user email inbox.

FIG. 4 illustrates example administrator rules that can be applied to an inactive user email inbox. The example administrator rules include: delete any email or email thread in the inbox that has been unread for over 8 weeks; remove email that is left unread after 4 weeks from team members who have moved to other parts of the organization; delete email after 2 weeks from users who are no longer working in the organization; delete weekly newsletters and repeat emails not read within 4 weeks of being received; and remove meeting invites not opened within 2 weeks of being received. Any combination of these rules can be applied to an inactive user email inbox by selecting or deselecting the rules.

In another exemplary embodiment, the email server 101 tracks the amount of time a user inbox is inactive with no user rules activated. Once the email server 101 determines that the user inbox has been inactive for at least the predetermined period of time (step 305), the email server 101 automatically applies the administrator rules 105 to the user inbox (step 306) without first sending the user a notification message. The user 108 can be previously informed of the administrator rules 105 and that these rules 105 would be applied if the user's inbox is inactive without appropriate user rules activated for a period of time.

In one exemplary embodiment, the administrator rules 105 can vary based on the role of the user within the organization. Here, the administrator 110 checks the organizational chart 111 to determine where the user falls in the organizational hierarchy. The administrator 110 then applies the administrator rules 105 accordingly. For example, the handling of messages for a user in the legal department is different than for a user in the human resources department, due to the different documentation requirements for each department. For another example, how a message is marked, moved or forwarded depends on the hierarchical level of the sender in the organization. If a message is received from someone higher up in the organizational hierarchy than the user, then the message can be flagged as important.

In an alternative exemplary embodiment, if a user inbox on the second list has not been inactive for at least the predetermined period of time, the administrator 110 contacts the manager or supervisor of the user associated with the user inbox to determine the user's status. If the user is determined to be on leave due to illness or some other extenuating circumstances, then the administrator 110 can proceed with applying the administrator rules 105 without waiting for the user inbox to be inactive for at least the predetermined period of time.

With either user rules 107 or administrator rules 105 applied to an inactive user inbox, stress on the email server 101 is reduced. Upon the user's return to work, the user's inbox is also more manageable.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for enforcing rule selection on user email inboxes, comprising:
   identifying inactive user inboxes stored at an email database that do not have appropriate user rules activated by:
      running a first agent on email messages stored at the email database to identify the inactive user inboxes; and
      running a second agent on the inactive user inboxes identified by the first agent, to identify the inactive user inboxes that do not have appropriate user rules activated;
   determining, for each inactive user inbox identified, if the user inbox has been inactive for at least a predetermined period of time; and
   applying administrator rules to the user inbox if the user inbox has been inactive for at least the predetermined period of time.

2. The method of claim 1, wherein the first agent returns a first list comprising the inactive user inboxes.

3. The method of claim 1, wherein the second agent returns a second list comprising the inactive user inboxes without appropriate user rules activated.

4. The method of claim 1, wherein the inactive user inboxes identified by the first agent have not been accessed for a second predetermined period of time.

5. The method of claim 1, wherein the inactive user inboxes identified by the second agent have no user rules activated or have user rules that do not meet a threshold of restrictiveness.

6. The method of claim 1, wherein determining, for each inactive user inbox identified, if the user inbox has been inactive for at least a predetermined period time, comprises:
   sending a notification message to a user associated with the user inbox if the user inbox has not been inactive for at least the predetermined period of time, the notification message informing the user that the administrator rules will be applied to the user inbox if appropriate user rules are not activated.

7. A method for enforcing rule selection on user email inboxes, comprising:
   identifying inactive user inboxes stored at an email database that do not have appropriate user rules activated;
   determining, for each inactive user inbox identified, if the user inbox has been inactive for at least a predetermined period of time; and
   applying administrator rules to the user inbox if the user inbox has been inactive for at least the predetermined period of time, wherein the administrator rules applied to the user inbox varies based on a role in an organization of a user associated with the user inbox.

8. A method for enforcing rule selection on user email inboxes, comprising:
   running a first agent on email messages stored at an email database;
   returning a first list by the first agent, the first list comprising inactive user inboxes;
   running a second agent on the first list;
   returning a second list by the second agent, the second list comprising inactive user inboxes without appropriate user rules activated; and
   determining, for each user inbox on the second list, if the user inbox has been inactive for at least a predetermined period of time,
      wherein administrator rules are applied to the user inbox if the user inbox has been inactive for at least the predetermined period of time, and
      wherein a notification message is sent to a user associated with the user inbox if the user inbox has not been inactive for at least the predetermined period of time, the notification message informing the user that the administrator rules will be applied to the user inbox if appropriate user rules are not activated.

9. The method of claim 8, wherein the inactive user inboxes identified by the first agent have not been accessed for a second predetermined period of time.

10. The method of claim 8, wherein the inactive user inboxes identified by the second agent have no user rules activated or have user rules that do not meet a threshold of restrictiveness.

11. The method of claim 8, wherein the administrator rules applied to the user inbox varies based on a role in an organization of the user associated with the user inbox.

12. The method of claim 8, wherein the determining comprises:
   determining if the user associated with the user inbox is on leave, if the user inbox has not been inactive for at least the predetermined period of time; and
   applying the administrator rules to the user inbox if the user is on leave.

* * * * *